April 21, 1964     E. R. HAMILTON     3,129,585
PYCNOMETER
Filed Jan. 15, 1962                               3 Sheets-Sheet 1
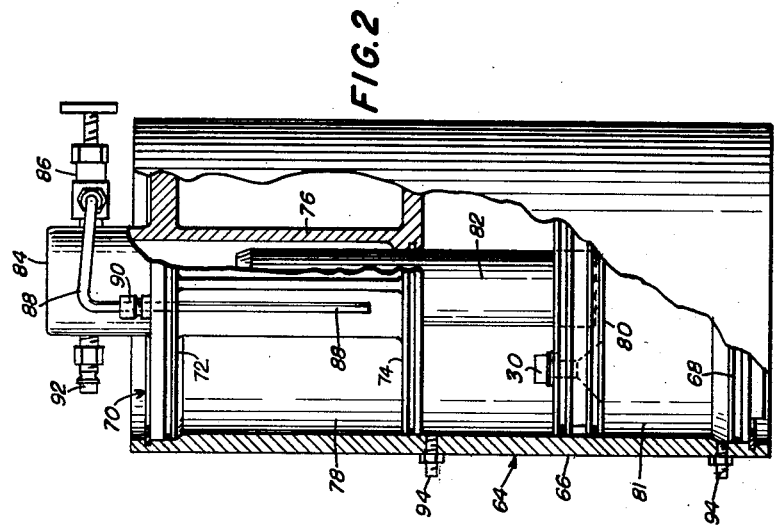
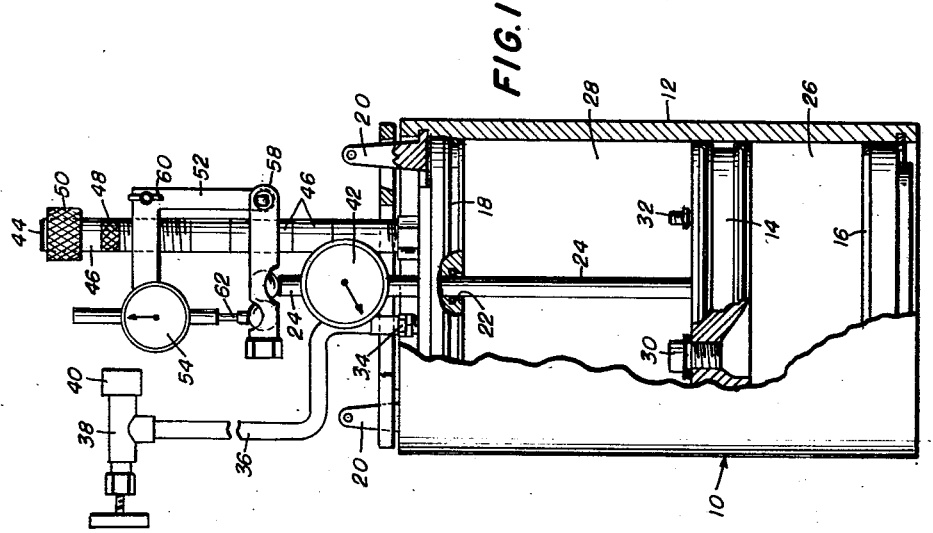
INVENTOR
*EDWARD R. HAMILTON*
BY Beale and Jones
ATTORNEYS April 21, 1964

E. R. HAMILTON 3,129,585

PYCNOMETER

Filed Jan. 15, 1962

INVENTOR
EDWARD R. HAMILTON
BY Beale and Jones
ATTORNEYS

April 21, 1964 E. R. HAMILTON 3,129,585
PYCNOMETER
Filed Jan. 15, 1962 3 Sheets-Sheet 3
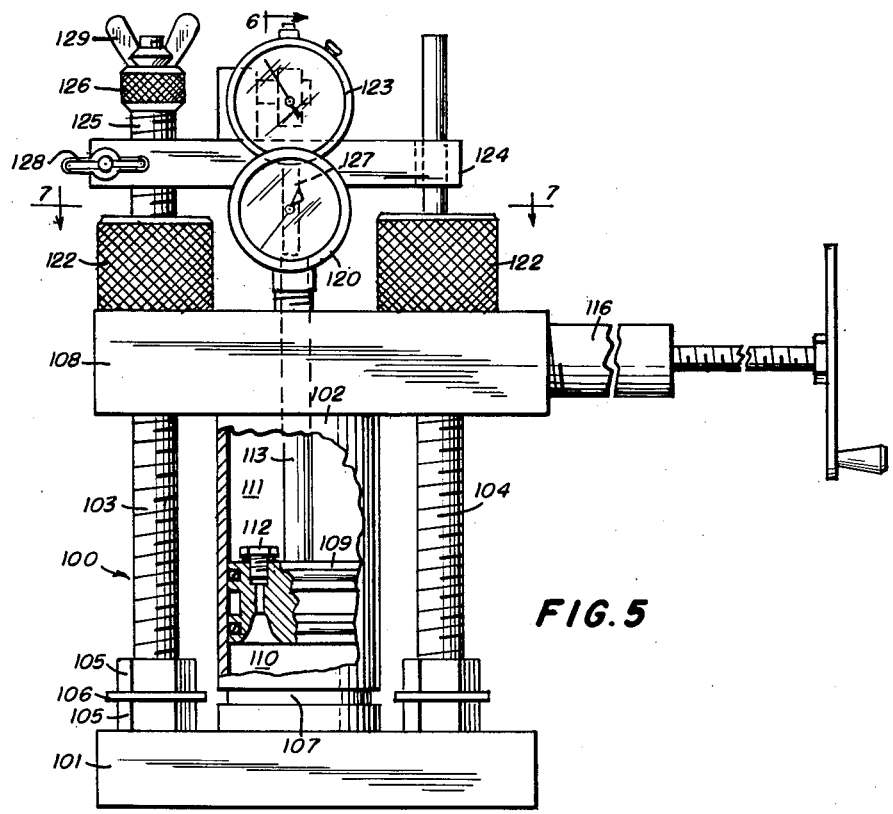
FIG.5
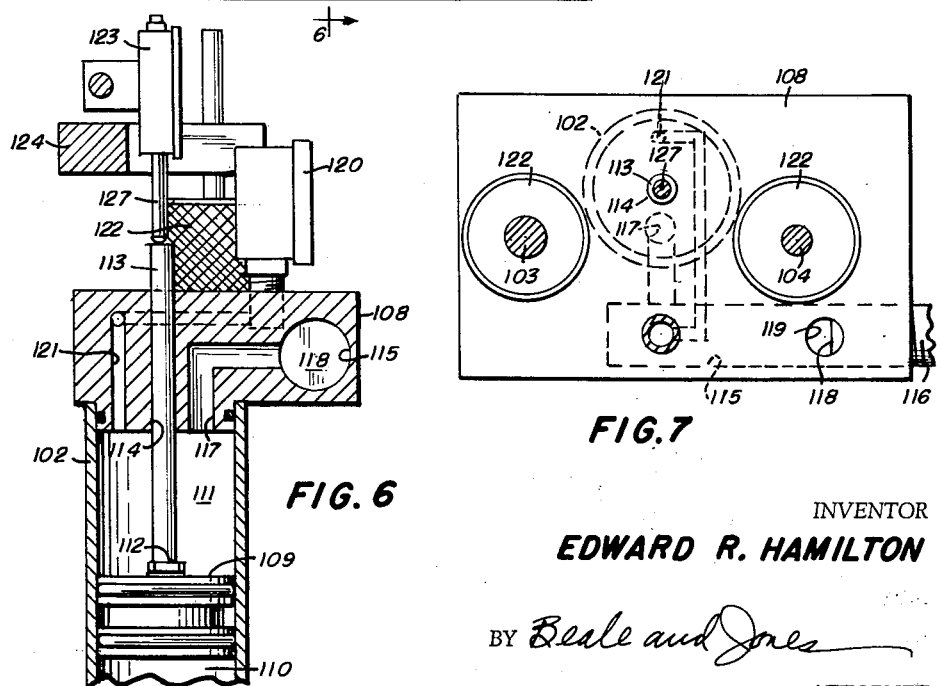
FIG.6
FIG.7
INVENTOR
EDWARD R. HAMILTON
BY Beale and Jones
ATTORNEYS

United States Patent Office 3,129,585
Patented Apr. 21, 1964

3,129,585
PYCNOMETER
Edward R. Hamilton, Austin, Tex., assignor to
Don A. Hart, Austin, Tex.
Filed Jan. 15, 1962, Ser. No. 166,163
5 Claims. (Cl. 73—149)

This invention relates to a pycnometer and more particularly to an apparatus for measuring under pressure the volume of a substance.

A pycnometer is a device for determining specific gravities. Specific gravity is the ratio of the weight of any volume of a substance to the weight of an equal volume of some other substance taken as the standard or unit. In the case of solids and liquids the standard is water at 4° centigrade. The instant invention provides an apparatus to measure the volume of substances primarily solids, for determining the specific gravity of the same. The apparatus of this invention may also be used to determine moisture content values, if certain other values are known or may be assigned, as will be more fully explained in the following specification.

The apparatus of this invention has been primarily designed to measure the volume of solids, such as soil samples. However, it will be realized by those skilled in the art that the invention is not be so limited in that the invention may be used to measure the volume of other solids and of liquids.

The accuracy of a specific gravity determination depends of course on the accuracy of the weighing and volume obtaining operations. In measuring the specific gravity of a solid, a special problem is present in that many solid substances contain void spaces which produce an erroneous volume figure when the volume of the solid is measured. To provide a more accurate volume figure, it is necessary to eliminate or decrease these void spaces as much as possible. In the case of solids this is most easily done by immersing the solid in a liquid, such as water, of known volume and subjecting the solid to pressure. During this operation a great part of the voids will be filled with the liquid. A portion of the air in the voids will be completely absorbed directly into the water before the water is saturated with air. In most soil samples and many other permeable materials this completely solves the problem of fully filling all of the air voids. Any air in excess of saturation will be compressed to a very small volume as expressed as a percentage of the total soil sample, thus reducing the error from this source. The volume measured under these conditions may be termed the absolute volume.

Accordingly, it is the principal object of this invention to provide an apparatus for accurately measuring the volume of a substance to determine its specific gravity and/or to facilitate determining its moisture content when its specific gravity is known.

It is a further object of this invention to provide an apparatus of this nature which will permit the volume of a substance to be measured quickly and easily.

A still further object of this invention is to provide an apparatus for accurately measuring the volume of a substance which will be extremely durable, trouble-free and inexpensive to manufacture. These and other objects and advantages of the invention will become apparent from the following specification and drawings wherein like numerals refer to similar parts throughout.

In the drawings:

FIGURE 1 is a partial elevational view and a partial section of the pressure vessel used to measure the volume of a substance;

FIGURE 2 is a partial elevational view and a partial section of a pump of this invention;

FIGURE 5 is a partial elevational view and a partial section of a modification of the invention;

FIGURE 6 is a section taken along the line 6—6 of FIGURE 5; and

FIGURE 7 is a section taken along the line 7—7 of FIGURE 5.

Figure 3:
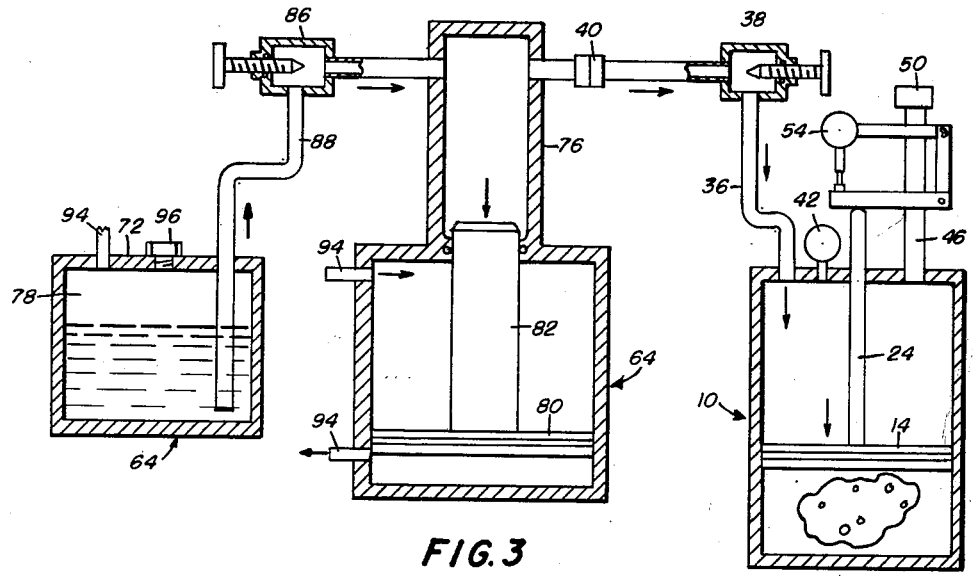
FIGURE 3 is a schematic diagram of one phase of the volume determination.

Basically, the volume measuring apparatus includes a pressure vessel adapted to receive and apply pressure to a substance to be measured, and a second pressure vessel or pump for applying pressure to the first mentioned vessel. Means is provided to determine the pressure in the pressure vessel and measure the volume of a sample of a substance contained therein.

Referring to the drawings and more particularly to FIGURE 1 it will be seen that the pressure vessel, generally designated 10, includes a cylindrical housing 12 adapted to receive a piston 14. The housing is closed at its bottom by a plate 16, and it has a detachable cover 18 at its top portion, both adapted to form seals with the inside walls of the housing for making the same pressure-tight. The cover 18 is releasably held in place by any convenient means such as a plurality of lugs 20. Centrally disposed in the cover 18 is an aperture 22 adapted to slidably receive a piston rod 24 attached to the piston 14. Sealing means is provided at this aperture to form an effective seal with the slidable piston rod 24. The piston 14 defines a measuring chamber 26 beneath its lower face and a pressure applying chamber 28 above its upper face. A removable plug 30 is provided in the piston for placing these two chambers in communication. The opening resulting from its removal is necessary for lowering the piston manually when the cover member 18 has been removed, since the piston is in sealing engagement with the inside walls of the housing 12. A valve stem 32 adapted to receive an air chuck is also provided in the piston 14 for removing the piston from its housing 12 after a volume measurement has been determined.

The cover 18 has secured thereto the necessary means for connecting a source of pressure to the pressure vessel 10, measuring the amount of this pressure and measuring the amount of travel of the free end of the piston rod 24. A fitting 34 adapted to receive a flexible hose 36 is provided in the cover 18. The hose 36 is in turn connected to a valve 38 having a quick-disconnect 40 adapting it for easy connection to the second pressure vessel or pump. Also attached to the cover 18 is a pressure gage 42 for reading the pressure in the pressure applying chamber 28.

A convenient to read indicator means is provided, and this is also attached to the cover 18. The indicator includes a standard or post 44 adapted to slidably receive a plurality of measuring sleeves 46 and a vernier sleeve 48. These sleeves are held in place by a nut 50. A right-angle shaped arm 52 having an indicator gage 54 at one of its ends is provided with a bore threadably engageable with the vernier 48 which is locked in place by a thumb-screw 60. The arm 52 is slotted through to its bore allowing it to be compressed by the thumbscrew. The other or lower end of the arm 52 is pivotally attached to a lever 58. The lever 58 is engageable with the free end of the piston rod 24 and a plunger 62 extending from the indicator gage 54. The units of measurement of the sleeves 46 and gage 54 are correlated with the cross-sectional area of the vessel 10 to provide the volume determination.

A second pressure vessel or pump, generally designated 64, provided for supplying pressure to the pressure vessel 10 is seen in FIGURE 2. The vessel 64 includes a cylindrical housing 66 having a bottom 68 in sealing engagement therewith and a closure assembly, generally designated 70. The assembly 70 in sealing engagement with the inside walls of the housing 66 includes a pair of parallel, spaced-apart walls 72, 74, and an inner liquid cylinder or chamber 76 which define with the housing 66 an annular chamber or reservoir 78. Slidably disposed in the cylindrical housing 66 is a first piston 80 defining between its underside and the bottom 68 on air chamber 81. A second piston 82 attached to the piston 80 is slidable in the inner liquid chamber 76. Both pistons act together as a freely sliding unit in the vessel 64. The cylinder 76 has an exterior extension 84 having an aperture in its wall adapted to receive a second hand-actuated valve 86. A tube 88 extends from the valve 86 through a fitting 90 in wall 72 and into the reservoir 78. The cylindrical extension 84 has a second aperture for receiving a fitting 92; this fitting is adapted to be received by the quick-disconnect 40 on the valve 38. Three air stems 94 (without cores) adapted to receive an air chuck are provided in the vessel 64. Two are mounted in the housing wall 66: one near the bottom 68 and a second near the wall 74. The third air stem (see FIG. 3) is mounted in the wall 72 for admitting air to the reservoir 78. A filler cap 96 (see FIG. 3) is provided in the wall 72 for access to the reservoir chamber 78.

It will be apparent to those skilled in the art that the apparatus of this invention provides a means for quickly and accurately measuring the volume of a substance under pressure to determine its specific gravity. A sample of the substance to be measured is immersed in water in the measuring chamber 26. The pressure applying chamber 28 is filled with water and pressure is applied by means of the pump 64. The pump, inter alia, multiplies the pressure from a conventional compressed air source to provide sufficient pressure for substantially eliminating the voids of the sample in the measuring chamber. The indicator means permits a determination of the length of travel of the piston rod 24 thereby providing the volume of the sample.

*Operation of Pycnometer*

A soil sample is generally typical of most permeable substances. The procedure will now be described for accurately measuring under pressure the volume of a soil substance to determine its specific gravity and to facilitate determining its moisture-content when its specific gravity is known.

The first operation is to determine the height of the body of water that will be used to immerse the soil sample. This may be termed as zero water.

(1) Remove the cover 18 and the piston 14 from the pressure vessel 10. Removal of the piston 14 may be facilitated by attaching an air chuck to the valve stem 32 and blowing or forcing the piston upwardly.

(2) Pour a quantity of water into the vessel 10 sufficient to completely cover the sample which will be introduced at a later step. Experience with the apparatus of this invention will enable the user to estimate this quantity. (The basic volumetric measurement will be the increase in volume with the introduction of the sample in the zero water.)

(3) Replace the piston 14 in the housing 12 after removing the plug 30. Air below the piston will be permitted to escape through the opening in the piston normally filled by the plug 30. When the piston contacts the water in the pressure vessel, replace the plug 30.

(4) Fill the portion of the vessel 10 above the piston 14 with water and attach the cover 18 using the lugs 20. The valve 38 should be open to allow excess water to escape, thereby permitting the cover 18 to rest in its fully seated position.

(5) Attach the quick-disconnect 40 on the valve 38 to the fitting 92 on the pump 64. (From this step the invention may be best understood by reference to all of the figures, including the schematic diagram of FIGURES 3 and 4.)

(6) Remove the filler cap 96 from the top of the pump 64 and fill the reservoir chamber 78 with water. Replace the filler cap.

Figure 4:
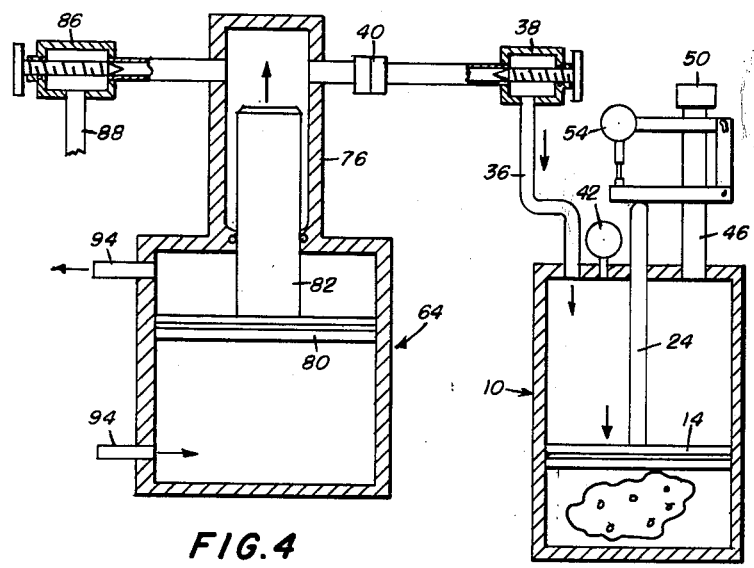
FIGURE 4 is a schematic diagram of a second phase of the volume determination.

(7) Open the valves 38, 86 and pressurize the reservoir 78 by attaching a suitable source of air at 80–85 p.s.i. to the air stem 94 in the wall 72. Sustain this pressure until there is no indication of pressure increase as shown on the pressure gage 42. Close the valve 86 and remove the air chuck. The reservoir will be bled to atmospheric pressure at the air stem. Referring to FIGURE 3 it will be seen that pressurizing the reservoir accomplishes two purposes: (1) it moves a large quantity of water towards and into the pressure vessel 10 until it is full, and it fills the valves and the hose 36 so that only a small additional amount of water is required to build final pressure; (2) the cylinder 76 is filled with water thereby forcing the pistons to their lowermost position where they will be ready for applying pressure to the pressure vessel 10.

(8) Close the valve 38 to prevent an uncontrolled pressure rise in the pressure applying chamber 28. Apply the air chuck to the lowermost air stem 94 on the pump and pressurize the space under the piston 80. This action will force the pistons 80 and 82 upwardly (see FIGURE 4) multiplying the pressure in the cylinder 76 by a ratio corresponding to the ratio of the areas of the faces on these pistons. The embodiment shown for purposes of illustration has been designed to develop 1200 p.s.i. in the vessel 10 with a compressed air supply of 80–85 p.s.i. Air above the piston 80 will escape from the other air stem 94.

(9) Maintain the air supply under the piston 80 and throttle the valve 38 until a pressure of 1200 p.s.i. is indicated on the gage 42. Close the valve 38 to maintain the pressure in the vessel 10.

(10) Remove the air chuck from the air stem 94 and allow air to escape from the pump 64. The pump can now be released for other work by uncoupling the quick-disconnect 40.

(11) Thumbscrew 60 is loosened and vernier 48 is rotated until arm 52 is threadably engaged at approximately the midpoint of vernier 48. This plus indicator gage 54 and lever 58 comprise an indicator assembly which is then installed on standard 44 with enough measuring sleeves 46 thereon and underneath vernier 48 that, upon engaging lever 58 with the free end of piston rod 24 and with the plunger 62, indicator gage 54 will be operating within its range. The remaining measuring sleeves 46 and nut 50 are installed in that order on standard 44 above vernier 48. Nut 50 is tightened enough to restrain perceptible rising of vernier 48 and measuring sleeves 46 but loose enough to permit rotation of vernier 48. Vernier 48 is rotated until all hands of indicator gage 54 are zeroed and thumbscrew 60 is then tightened securely. Nut 50 is tightened securely. If the hands are no longer zeroed, the rim of indicator gage 54 is loosened and rotated until the hands are zeroed, after which the rim is locked in position with the hands zeroed for later direct indications of volume change.

(12) Remove from standard 44 the nut 50, those measuring sleeves 46 above vernier 48 and the indicator assembly. Do not remove any sleeves 46 that were below vernier 48.

(13) Open the valve 38 and bleed off the pressure from the pressure vessel 10. Remove the cover 18 and drain the water above the piston 14 which is still in place.

(14) Remove the piston by slowly blowing it out of the vessel 10 using an air chuck attached to the valve stem 32. Be careful not to lose any zeroing water from under the piston 14.

If repeated operations are made using a known volume of water, such as from a burette, then steps 1–14, supra, could be omitted after the indicator assembly has been zeroed.

The absolute volume of a substance may now be determined.

(15) Select a representative sample of the soil to be measured and weigh this sample. The quantity selected should be small enough for complete immersion in the zero water.

(16) Place the sample in a plastic bag of known weight and volume. The use of a plastic bag makes handling of the sample easier, and it prevents abrasive damage to the inside of the pressure vessel 10.

(17) Place the sample and the bag into the zero water of the vessel 10 so the water overflows into the bag without washing out the soil or muddying the zero water.

(18) Replace the piston as described in step 3, supra. Do not permit any of the zero water to escape above the piston.

(19) Fill the space above the piston as in step 4, supra. Replace the cover 18, including standard 44 and all measuring sleeves 46 that were not removed therefrom in step 12, supra. Pressurize the vessel 10 as set forth in steps 4 through 9, supra, until the pressure gage 42 indicates exactly the same pressure as was indicated in step 9, supra. Observe the pressure indicator for two minutes. Should there be any perceptible pressure losses within this period, similarly pressurize vessel 10 until there is no perceptible pressure loss for a period of two minutes; thus indicating no further significant sample saturation.

(20) Mark the top measuring sleeve 46 on standard 44, such as by placing a rubber band around it, so that it and all measuring sleeves 46 underneath it can be disregarded in subsequent steps.

(21) Install the indicator assembly with enough additional measuring sleeves 46 on standard 44 before the marked measuring sleeve 46 and vernier 48 so that, upon engaging lever 58 with the free end of piston rod 24 and with the plunger 62, indicator gage 54 will be operating within its range. The remaining measuring sleeves 46 and nut 50 are installed in that order on standard 44 above vernier 48. Tighten nut 50 securely.

(22) The total volume of the plastic bag and the soil sample is the sum of those values of measuring sleeves between the marked measuring sleeve 46 and vernier 48, plus the indicator gage 54 reading. The volume of the soil sample V only is this volume less the volume of the plastic bag and is designated as V in the formulae that follows. (The volume of the plastic bag could have been determined earlier, if not already known or calculated from the area when flattened times the membrane thickness by performing steps 1 through 22, supra, with the soil sample omitted.)

(23) Disassemble the apparatus and remove the sample from the vessel 10. If dry weight is known as from an oven-dried sample, then:

$$G = \frac{DW}{V}$$

where:
G = Specific gravity of solids.
DW = Dry weight of sample as previously determined or assigned.
V = Volume of sample, as determined in steps 1 through 22, supra. This volume must be in units compatible with the weight (W or DW) of the sample, for example, in cc. if the sample is weighed in grams, or in the equivalent volume of a pound of water at 4° C. if weighed in pounds.

If the moisture content (M) is not known, but if the wet-weight (W), the volume of the sample (V) from steps 1-22 supra, and the specific gravity of the solids (G) are known or assigned, the moisture content (M) may be found by the following formula:

$$M = \frac{\text{weight of moisture}}{\text{dry weight}} \times 100 = \frac{\frac{VG-W}{G-1}}{W - \frac{VG-W}{G-1}} \times 100$$

where:
M = Moisture is expressed as a percentage of dry weight.
W = Weight of sample as determined in step 15, supra.

If specific gravity or moisture content of the sample is known, the step of oven baking may be eliminated. It has been found convenient to provide appropriate tables with the pressure pycnometer of this invention to obviate the solving of mathematical equations in determining specific gravity and moisture content values. The tables are based on a given weight of the sample to be measured, and this weight must be accurately determined at the beginning of the procedure. The determination of these values may also be simplified by making the measuring sleeves 46 of a size to measure "one pound" of a volume equal to one pound of distilled at 4° C.

Thus, it will be seen that this invention provides an apparatus for accurately measuring the volume of a solid substance to determine its specific gravity and/or to facilitate determining its moisture content when its specific gravity is known. The volume of the sample is measured under pressure thereby eliminating most of the void spaces in the substance for determining an absolute volume figure. This in turn permits the finding of an accurate specific gravity or moisture content value. The apparatus is simple to operate making it possible to determine these values quickly and easily. The apparatus is very durable allowing it to be used at a job site as well as in a laboratory.

The apparatus of this invention, in conjunction with appropriate tables, provides for the first time a means whereby an accurate on the job site determination of the moisture content of a soil sample can be made before any significant change therein occurs. This minimizes costly processing of the soil mass to meet specifications. Heretofore, the moisture content and physical characteristics of the soil mass could and frequently did change significantly before this figure could be determined. This disadvantage was due mainly to the amount of time consumed and elevated temperatures required in determining its dry weight by conventional oven-drying or other methods.

A modification of the pycnometer of this invention is shown in FIGURES 5 through 7. It has been found desirable to provide a small simplified pycnometer which may be easily used with small samples (50–100 grams). The modification of this invention provides such a pycnometer. In principle it is the same as the apparatus of FIGURES 1 through 4; it is merely smaller in size and simplified in certain parts as will be apparent from the following description.

Referring particularly to FIGURE 5, the modified pycnometer, generally designated 100, is seen to include a base member 101 adapted to detachably receive a vertically disposed cylinder 102. The upper surface of the base member has a boss adapted to receive an O-ring for providing a seal between the base and the cylinder 102. A pair of threaded upright members 103 and 104 are secured to and extend upwardly from the base member 101. A pair of nuts 105 one on each side of elongated cams 106 are provided at the base of each upright. The cylinder 102 has an annular groove 107 adapted to receive the end portion of the cams 106 when they are rotated to the appropriate position; this feature aids in holding the cylinder 102 to the base 101 when the detachable cover member 108 has been removed.

The cover member 108, which provides a variety of functions, has a pair of apertures for receiving the uprights 103, 104, and it has a boss and O-ring for forming a seal at the top of the cylinder 102. The cover 108 is not threadably engageable with the uprights; it is merely dropped into position until it is in sealing engagement with the cylinder 102.

A piston 109 is provided in the cylinder defining on the lower side thereof a measuring chamber 110 and on the upper side thereof a pressure applying chamber 111. A removable plug 112 is located in the piston for placing the two chambers in communication. The opening resulting from its removal is necessary for lowering the piston manually when the cover has been removed, since the piston is in sealing engagement with the inside walls of the cylinder 102. A piston rod 113 is attached to the piston, and it extends upwardly through an aperture 114 in the cover 108 as best viewed in FIGURE 6. Sealing means is provided at this aperture to form an effective seal with the slidable piston rod 113.

Referring particularly to FIGURE 6, the cover 108 will be seen to contain a chamber 115. This chamber is open at one side of the cover 108 for threadably receiving a hand pump 116, and it is in communication with a passageway 117. The passageway 117 opens into the pressure applying chamber 111. The chambers 111, 115 and the passageway 117 may be filled with a pressure applying medium, such as water, by withdrawing the pump piston 118 (see FIGURE 7) a sufficient distance to open the chamber 115 to the atmosphere at the aperture 119. It will be readily apparent that by pouring water into the aperture 119 and turning the handcrank on the pump 116, pressure will be applied to the upper surface of the piston 109 tending to force it downwardly.

Pressure in the pressure applying chamber 111 is measured by a standard pressure gage 120 which is placed in communication with the chamber 111 by a second passageway 121.

The detachable cover 108 is secured in sealing engagement with the cylinder 102 by a pair of quick disconnect nuts 122 threadably engageable with the uprights 103 and 104.

An indicator assembly including an indicator gage 123, a crossbar 124 and an externally threaded sleeve 125 are provided to measure the length of travel of the free end of the piston rod 113. The portion of the uprights 103 and 104 above the nuts 122 is not threaded except for a small portion at the top of the upright 103. The sleeve 125 is freely slidable and rotatable on the upright 103; it is permitted to slide down into place until it contacts a shoulder on the upright 103. The cross-bar 124, which supports the gage 123, has a bore threadably engageable with the sleeve 125. Rotation of the vernier 126 integral with the sleeve 125 will move the gage 124 and its dependent plunger 127 up or down depending on the direction of rotation applied. The cross-bar 124 may be locked in place with respect to the sleeve 125 by use of a thumbscrew 128. The cross-bar 124 is slotted through to its bore allowing it to be compressed by the thumbscrew. The other end of the cross-bar 124 is slotted to freely-receive the upper unthreaded portion of the upright 104. The vernier 126 and its associated parts are held in place by a wing-nut 129 threadably mounted on the extreme upper portion of the upright 103.

It will be seen that the indicator assembly disclosed for this modification of the invention provides a convenient and simple means to measure the length of travel of the piston rod 113. After pressure has been applied during the zero water phase of the volume determination, the vernier 126 is rotated until the plunger 127 is brought into contact with the piston rod 113. The thumbscrew 128 is then tightened preventing further vertical movement of the cross-bar 124 and its associated parts. The gage 123 may be accurately "zeroed" by rotation of its dial. The wing-nut 129 is released allowing the indicator assembly to be removed from the pycnometer. The thumbscrew 128 must remain tight. After the sample has been placed in the chamber 110 and the identical pressure applied, the indicator assembly is again dropped into place on the uprights and secured by the wing-nut 129. Since the piston 109 and piston rod 113 will now be at a higher position, the plunger 127 will be forced upwardly reflecting the amount of travel of the piston rod 113 on the gage 123.

Thus, it will be apparent to those skilled in the art that the apparatus of this modification of the invention provides a means quickly and accurately measuring the volume of a substance under pressure to determine its specific gravity or moisture content. The device is lightweight, easy to assemble, and adapted to handling small samples. A sample of the substance to be measured is immersed in water in the measuring chamber 110. The chambers 111, 115 are filled with water at the aperture 119 and pressure is applied by the hand pump 116 providing sufficient pressure for substantially eliminating the voids of the sample. The indicator means permits a determination of the length of travel of the piston rod 113 thereby providing the volume.

A detailed step by step operation of the modified apparatus will not be given. This apparatus is in principle the same as the apparatus of FIGURES 1 through 4, and it will be obvious to those skilled in the art that the operation is substantially the same.

While this invention has been shown in but a limited number of forms, it is obvious to those skilled in the art that it is not so limited, but it is susceptible of various changes and modifications without departing from the spirit and claims of the invention.

I claim:

1. In a pycnometer for measuring under pressure the volume of a substance, a first pressure vessel having a freely slidable piston disposed therein defining a measuring chamber on one side thereof adapted to receive a sample of said substance immersed in a liquid, and defining a pressure applying chamber on the other side thereof adapted to receive a pressurizing medium, a detachable cover member on said first pressure vessel permitting said piston to be withdrawn from the first pressure vessel, means on said first pressure vessel for operably connecting pressure applying means to said pressure applying chamber, said pressure applying means comprising a second pressure vessel having a cylindrical air chamber and an inner cylindrical liquid chamber, said liquid chamber being substantially smaller in cross section than said air chamber, first and second pistons in said second pressure vessel, said first piston slidable in said air chamber and said second piston slidable in said liquid chamber, means on said second pressure vessel for communicating said liquid chamber with said pressure applying chamber of said first pressure vessel, means on said second vessel for attaching a supply of compressed air to said air chamber, and indicator means on said first pressure vessel for measuring the length of travel of said piston, whereby the admission of compressed air at a given pressure to said air chamber will produce a greater pressure in said liquid chamber and whereby the application of pressure to said pressure applying chamber, said piston of said first pressure vessel is displaced axially for substantially filling the voids in said sample with said liquid to measure the volume of the sample.

2. In a pycnometer according to claim 1 wherein said second pressure vessel includes a reservoir chamber, said reservoir chamber being in communication with said liquid chamber and with said pressure applying chamber, said reservoir chamber having means for receiving a supply of compressed air.

3. In a pycnometer for measuring under pressure the volume of a substance, a cylindrical pressure vessel having a freely slidable piston disposed therein, a detachable cover member on said vessel having a central aperture adapted to slidably receive a piston rod attached to said piston, means on said cover member for effecting a seal at said aperture, said piston defining a measuring chamber on one side thereof adapted to receive a sample of said substance immersed in a liquid, and defining on the other side thereof a pressure applying chamber adapted to receive a pressurizing medium, means on said piston for placing said measuring chamber in communication with said pressure applying chamber when said cover member has been removed, means on said pressure vessel for operably connecting pressure applying means to said pressure applying chamber, a pressure gage on said vessel for measuring the pressure in said pressure vessel, and indicator means on said cover member for measuring the length of travel of the free end of said piston rod, said indicator means comprising a standard attached to said cover member and adapted to slidably receive a plurality of measuring sleeves thereon, an indicator assembly adapted to rest on the uppermost of said sleeves, said indicator assembly including a right-angled arm having an indicator gage attached to its uppermost portion, said indicator gage having a plunger depending therefrom, and a lever pivotally attached at one of its ends to the lowermost portion of said right-angle arm and engageable at its other end with the free end of said piston rod and with said plunger, whereby the application of pressure to said pressure applying chamber said piston is displaced axially reducing said measuring chamber for substantially filling the voids in said sample with said liquid and measuring the volume of the sample according to the displacement of said piston.

4. In a pycnometer for measuring under pressure the volume of a substance, a base member having at least one upright member and adapted to detachably receive a vertically disposed cylinder, said cylinder having a freely slidable piston disposed therein defining a measuring chamber on one side thereof and a pressure applying chamber on the other side thereof, said piston having a piston rod, a horizontally disposed, detachable cover member on said cylinder permitting said piston to be withdrawn from the cylinder, said cover member having an aperture adapted to receive said upright member and an aperture adapted to receive the piston rod of said piston, means on said piston for placing said measuring chamber in communication with said pressure applying chamber when said cover member has been removed, means on said cover member for receiving pressure applying means and placing it in communication with said pressure applying chamber, means for measuring the pressure in said cylinder, and indicator means on said upright member, said indicator means comprising a bracket adjustably secured to said upright member, a dial gage mounted on said bracket having its plunger engageable with the rod of said piston, whereby upon the application of pressure to said pressure applying chamber said piston is displaced axially for substantially filling the voids in said substance with said liquid to measure the volume of the substance.

5. In a pycnometer according to claim 4 wherein said pressure applying means includes a hand operated pump engageable with said cover member.

References Cited in the file of this patent
UNITED STATES PATENTS

| | | |
|---|---|---|
| 2,675,624 | Kristensen | Apr. 20, 1954 |
| 2,874,565 | Kelton | Feb. 24, 1959 |
| 2,924,096 | Humphres | Feb. 9, 1960 |
| 2,967,427 | LeBlanc | Jan. 10, 1961 |